E. HANSON.
AUTOMATIC LUBRICATOR.
APPLICATION FILED MAR. 7, 1919.
1,334,899.
Patented Mar. 23, 1920.
2 SHEETS—SHEET 1.
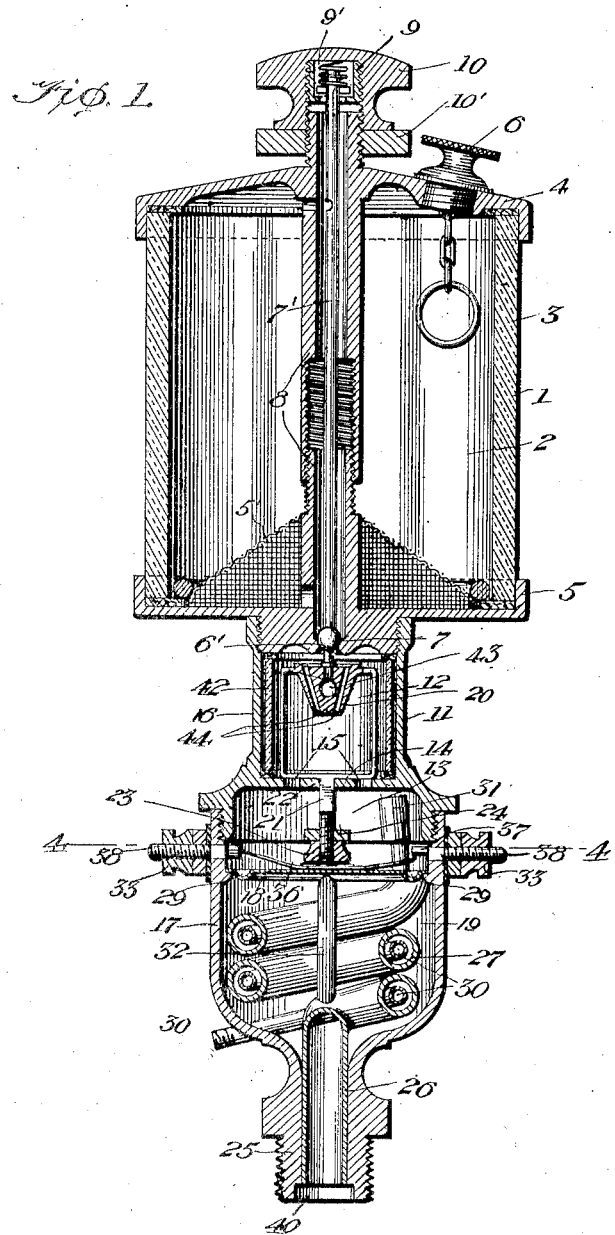
Witness
R. E. Rousseau
D. B. Phillips
Inventor
Ezekiel Hanson,
By Victor J. Evans,
Attorney

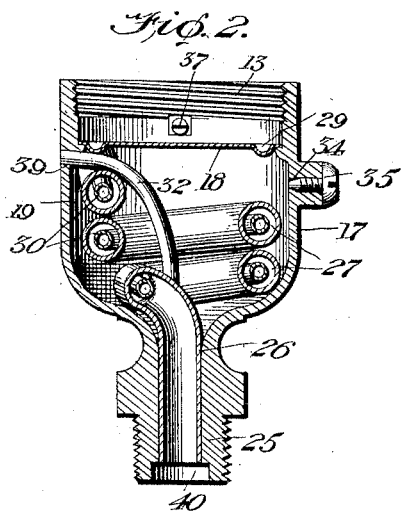
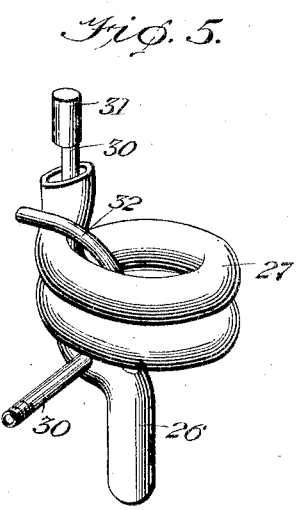
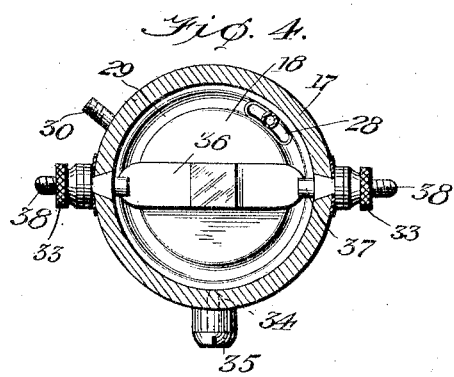
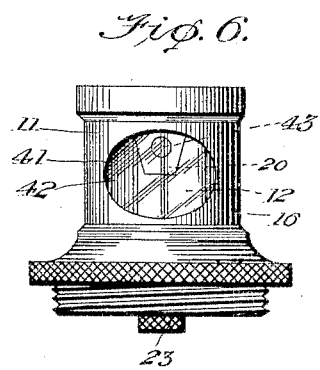
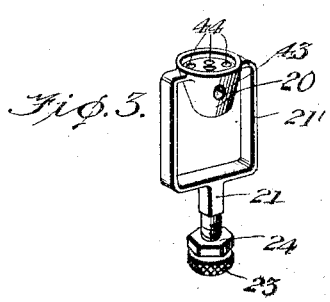

UNITED STATES PATENT OFFICE.

EZEKIEL HANSON, OF CORNING, CALIFORNIA.

AUTOMATIC LUBRICATOR.

1,334,899.  Specification of Letters Patent.  Patented Mar. 23, 1920.

Application filed March 7, 1919. Serial No. 281,222.

*To all whom it may concern:*

Be it known that I, EZEKIEL HANSON, a citizen of the United States, residing at Corning, in the county of Tehama and State of California, have invented new and useful Improvements in Automatic Lubricators, of which the following is a specification.

This invention relates to improvements in lubricators and has particular reference to a device of this character in which the flow of oil or other lubricant is controlled by a thermoscopic device.

The principal object of the invention is to provide a lubricator having a thermoscopic device that will automatically permit the flow of oil to a hot and dry bearing, and, if desired, at the same time close the circuit of an electric alarm.

Another object of the invention is to provide a lubricator having an oil pocket, the flow of oil which is controlled by a thermoscope, and a connection between the oil pocket and the oil outlet of the lubricator extending through the expansion chamber of the thermoscope, so that when oil flows through the connection it will cool the expansion chamber and actuate the thermoscope to shut off the flow of oil.

Another object is to provide a tube for admitting air to the oil pocket and reservoir to replace the oil flowing to the bearing, which will also extend through the expansion chamber, so that the air drawn into the oil pocket will further assist in cooling the thermoscope.

A further object is to provide a closed reservoir with a filter and a tubular valve connection between the reservoir and the upper end of the oil pocket so that the oil will be permitted free movement from the reservoir to the pocket, and at the same time admission of the outside air to the pocket by any other channel than the tube provided for the purpose will be prevented.

A fourth object is to so arrange the tubular connections extending through the expansion chamber of the thermoscope that the most efficient cooling action may be obtained when the oil is released from the reservoir, while previously to the release of the oil the tubular connections will form a heating unit adapted for conveying heat from a dry bearing to the expansion chamber.

With these objects in view and such others as will hereinafter appear I have embodied the invention in the preferred form described in the specification below and illustrated in the drawing.

In the drawings:—

Figure 1 represents a vertical section through the lubricator.

Fig. 2 represents a vertical section through the expansion chamber of the thermoscope and associated parts, and is taken on a plane at right angles to that of Fig. 1.

Fig. 3 is a detail perspective view of the lower valve stem controlling the flow of oil from the valve.

Fig. 4 represents a transverse section taken on the plane indicated by the line 4—4 of Fig. 1.

Fig. 5 is a perspective view showing in detail the tubular oil and air connections to the oil pocket.

Fig. 6 is a side elevation illustrating the casing surrounding the oil pocket.

In the drawings, the numeral 1 indicates the device as a whole. It has an oil reservoir 2 which may conveniently consist of a glass cylinder 3 having its ends tightly closed by upper and lower heads 4 and 5 respectively. The heads have hollow portions 8 extending through the cylinder 3 and adapted for mutual screw threaded engagement to clamp the heads upon the cylinder. An opening is provided in the upper head 4 for filling the reservoir, and has screw threaded or otherwise secured therein a plug 6 by which it is normally tightly closed. A funnel shaped filter 5' is seated on the lower head 5 which is formed with an oil outlet 6', the flow of oil through which may be adjusted by a valve 7 having a stem 7' which in the present instance extends upwardly through the hollow connecting portions 8 of the heads and terminates upwardly from the head 4, in a manually operable member 10 inclosing a hollow plug 9 which has a spring 9' pressing against a flange on the upper part of the tubular stem 7' and the said member 10 by which the valve may be adjusted is kept in its set position by a lock nut 10'. Screw threaded or otherwise properly secured on the lower head 5 over the outlet 6' is a hollow body 11. The body 11 is formed with an upper chamber constituting an oil pocket 12 and adapted for receiving oil from the outlet 6'. The body 11 is further formed with a lower chamber 13 separated from the pocket 12 by a partition 14 formed with passages or openings 15 adapted for permitting flow of oil from the pocket to the lower chamber 13. Preferably, the body 11 is formed outwardly from the oil pocket 12 with openings 41 to permit the flow of oil into the pocket through the outlet 6' to be observed. In this case the walls of the pocket 12 consist of a glass tube 42 which forms a tight joint at its lower end with the partition 14, and at its upper end seats tightly against the head 5. Preferably the body 11 is constructed with upper and lower sections 16 and 17 respectively, having screw threaded connection at a point below the partition 14. Extending across the lower section 17 is a flexible diaphragm 18 tightly closing a portion of the lower chamber 13, which thereby constitutes an expansion chamber 19. Extending through the pocket 12 and lower chamber 13 is the valve stem 21, slidably mounted in a suitable opening 22 in the partition 14. The lower end of the valve stem 21 is adapted to bear against spring contact arm 36 and the diaphragm 18 so that in the movement of the diaphragm the valve 7 will be actuated to open and close the opening 6'. Preferably the valve stem 21 is provided for adjustment with a separately formed lower portion consisting of a sleeve 23 screw threaded on the lower end of the portion 21 of the stem and held in position by lock nut 24. To prevent rotation of the valve, the opening 22 may be squared and the stem 21 similarly formed as indicated in the drawing.

The valve stem 21 is composed of a rectangular part 21', and the top thereof carries an inverted cone shaped member 20 having oil holes 44 passing therethrough and its top located directly below the outlet port 6' so as to receive the oil therefrom. The cone shaped member 20 has an air hole 43 extending upward from its sides to the center where the said air hole forms a seat and a sliding connection with the tubular stem 7', which carries the valve 7. At the point of this connection a tapered flange is provided outwardly from the tubular stem 7' which fits tightly against a similar formed seat in the cone shaped member 20. This forms a tight connection with the air hole 43 and the tubular stem 7'.

The lower end of the body 11 terminates in a shank 25 which is screw threaded or otherwise adapted to be secured in the oil opening of a bearing. The shank 25 is formed centrally with a longitudinal bore 40, having tightly inserted therein the lower end of a tube 26 which is preferably formed intermediately of its ends in a coil 27 disposed within the expansion chamber 19 and has the upper end suitably connected with an opening 28 in the diaphragm 18. Preferably the diaphragm 18 has an annular depression 29 with which the opening 28 coincides so that oil in the upper chamber 13 will be completely drained off to the bearing through the tube 26. A tube 30 connects an upper portion of the upper chamber 13 with the atmosphere and extends through the expansion chamber 19 whereby when the oil flows from the chamber 13 through the tube 26 to the bearing, air will be drawn through the tube 30 to cool the expansion chamber. Preferably the tube 30 is of less diameter than the tube 26 and extends through the latter to a point toward its lower extremity, at which point it is led out through the side of the tube 26 and through the wall of the body. The upper end of the tube 30 may have a suitable shield or cap 31 by which oil will be prevented from entering the tube.

As shown in the drawings, a tube 32 is connected to the tube 26 toward its lower extremity and extends upwardly through the expansion chamber 19 and is properly connected with a suitable opening 39 in the side of the body 11 in which it is tightly secured. By means of the tube 32 oil may be applied to the bearing with an oil can or in any other convenient manner when desired, and in the event of stoppage of the oil outlet of the tube 26 the oil will rise and flow through the tube 32 thereby indicating that such stoppage has occurred. A wire can then be pushed through tube 32 to the revolving shaft to open the oil outlet. It also forms an outlet for the air, that otherwise would expand against the flow of oil in tube 26 on its way to the bearing. When the bearing becomes heated the tube 32 will assist the tube 26 in conveying the heat to the air within the expansion chamber 19. The lower section 17 of the body is preferably formed in the wall with an opening 34 normally closed by a plug 35 screw threaded or otherwise properly secured therein, and adapted to be removed when desired to permit equalization of the pressure within the expansion chamber 19 and that of the atmosphere near the bearing.

When desired, the lubricator may be arranged to close the circuit of a bell or other alarm when the bearing becomes heated, this being accomplished in the present instance by providing in contact with the diaphragm 18, the spring contact arm 36 which is adapted for establishing connection with a contact stud 37 in an outward movement of the diaphragm. The arm 36 and stud 37 are properly insulated and provided with suitable means of connection indicated as members 33 and as binding-posts 38.

From the above description taken in connection with the drawing, the operation of the device will be clearly understood. Normally the outlet 6' is opened to a desired degree by actuation of the member 10 to permit the oil to flow to the pocket 12 at a desired rate or to prevent entirely the flow of oil from the reservoir. It will be seen that the air displaced from the pocket is permitted free movement to the upper end of the reservoir through the tubular stem 7'. When the bearing becomes heated, the heat will be conveyed through the tubes 26 and 32 to the air within the expansion chamber 19 which being thereby caused to expand will move the diaphragm 18 outwardly thereby forcing the lower valve stem 21, which has connection with upper stem 7' and the valve 7 in an upward position, permitting the oil in the reservoir to flow freely to the bearing which will cool off from the receiving coil. In this movement of the oil, air will be drawn through tube 30. The flow of oil and air through the tubes 30 and 26 respectively will result in rapid cooling of the air within the expansion chamber 19, so that the valve will be closed to prevent an unnecessary prolonged flow of oil to the bearing.

While the above described form of the invention is considered preferable, the invention is obviously not restricted to the particular embodiment set forth, and the right is reserved to variation, modification and the use of equivalents falling within the spirit and scope of the invention as indicated by the latitude of the claims.

What is claimed is:—

1. A lubricator comprising an oil reservoir, a body connected therewith and having a pocket for receiving oil from the reservoir, a valve controlling the flow of oil from the reservoir to the pocket, said body having a chamber located below the pocket, a diaphragm in said chamber, a tube having one end connected with the outlet of the lubricator and its other end passing through the diaphragm for leading the oil from above the diaphragm to the outlet and means for actuating the valve by the movement of the diaphragm.

2. In a lubricator, the combination with the oil reservoir, of a body formed with a pocket adapted for receiving oil from said reservoir, a tube connecting said pocket and the outlet of the lubricator, a valve normally preventing flow of oil to the pocket, a thermoscopic device for opening and closing said valve, said device having an expansion chamber, and said tube extending through said chamber, and a second tube extending through said expansion chamber, said second tube establishing connection at one end with said oil pocket, and having the other end open to the atmosphere.

3. In a lubricator, the combination with the oil reservoir, of a body formed with a pocket adapted for receiving oil from said reservoir, a valve for controlling the supply of oil from the reservoir to the pocket, said body further formed with a chamber having a connection with said pocket, a thermoscopic device for opening and closing said valve, said device having an expansion chamber and a diaphragm therein, and concentric tubes extending through said expansion chamber and establishing connection at one end with the first-mentioned chamber, one of said tubes having connection at its other end with the atmosphere, and the other of said tubes adapted at its other end for connection to the oil opening of a bearing.

4. In a lubricator, a closed oil reservoir having an oil outlet, a hollow body mounted on the lower end of said reservoir and formed with an oil pocket establishing connection with said outlet, a tubular stem forming an air vent connection between the upper end of the pocket and the reservoir and having a valve thereon for controlling the flow of oil to the pocket, said body further formed with a lower chamber and with a passage between said pocket and said lower chamber, a diaphragm closing a portion of said lower chamber, means for actuating the valve by the movement of the diaphragm, and a pair of tubes extending through the portion of said lower chamber closed by the diaphragm, said tubes having connection at one end with the portion of said chamber communicating with said passage, one of the tubes having connection at its other end with the atmosphere, and the other tube adapted at its other end for connection to the oil opening of a bearing.

5. A lubricator comprising an oil reservoir, a body having a pocket therein for receiving the oil from said reservoir, a valve for controlling the flow of oil to the pocket, a thermoscopic device for opening and closing said valve, means for regulating the operation of said device, said means consisting of a tubular stem having its lower end forming the valve and said stem having a connection in said pocket, a second valve stem operated by said thermoscopic device, and an adjustable member connected with the upper end of the first stem and having a lock nut adapted to hold said member and valve in an open or closed position.

6. A lubricator comprising an oil reservoir, a body having a pocket therein for receiving the oil from said reservoir, a valve normally closing said connection, a connection between said pocket and the outlet of the lubricator, a thermoscopic device for opening and closing said valve, said device including an expansion chamber and a tube connected with the outlet of the lubricator and passing through the said chamber to the exterior thereof for heating the chamber and serving the purposes of an emergency oiling opening, a cleaning tube for the outlet, and an overflow for the oil when the outlet is stopped up.

7. A lubricator comprising an oil reservoir, a lower body in communication with the reservoir, a hollow valve controlling such communication, a hollow stand connected and having an opening therein communicating with the upper part of the oil reservoir, an expansion chamber in the body, a diaphragm therein upon which the oil drops, means for conducting the oil from the diaphragm to the outlet of the lubricator, means for supplying air to the chamber above the diaphragm, and means for directing said air through the hollow valve and its hollow stem into the reservoir to prevent the formation of a vacuum therein while the oil is flowing therefrom.

8. A lubricator comprising an oil reservoir, a body below the same and in communication therewith, a hollow stem having a valve formed thereon for controlling such communication, a diaphragm in the hollow body, a second stem within the hollow body, and adapted to be engaged by the diaphragm to move the valve off its seat, an oil distributer forming part of said stem and provided with air ducts for leading air to the hollow stem, and means below the diaphragm for leading the oil therefrom to the outlet of the lubricator and for admitting air to the body above the diaphragm.

9. A lubricator comprising an oil reservoir, a hollow body below the same and in communication therewith, a valve controlling such communication, a diaphragm in the hollow body, means for causing the movement of the diaphragm to move the valve off its seat, an electric alarm operated by said diaphragm, a tube below the diaphragm and having one end passing through the center and its other end connected with the outlet of the lubricator and a second tube communicating with the atmosphere and having its inner end passing through the diaphragm for admitting air to the hollow body above the diaphragm.

In testimony whereof I affix my signature.

EZEKIEL HANSON.